United States Patent
Hayakawa

(10) Patent No.: US 6,179,547 B1
(45) Date of Patent: Jan. 30, 2001

(54) WORK LOADING/UNLOADING APPARATUS

(75) Inventor: Minoru Hayakawa, Kanagawa (JP)

(73) Assignee: Amada Metrecs Company, Limited, Kanagawa (JP)

( * ) Notice: Under 35 U.S.C. 154(b), the term of this patent shall be extended for 0 days.

(21) Appl. No.: 09/297,881

(22) PCT Filed: Nov. 11, 1997

(86) PCT No.: PCT/JP97/04100
  § 371 Date: Jun. 15, 1999
  § 102(e) Date: Jun. 15, 1999

(87) PCT Pub. No.: WO98/21005
  PCT Pub. Date: May 22, 1998

(30) Foreign Application Priority Data

Nov. 11, 1996 (JP) .................................................. 8-298880

(51) Int. Cl.⁷ .................................................. B65G 57/00
(52) U.S. Cl. .................................... 414/788.4; 198/468.4; 198/468.8
(58) Field of Search ............................ 198/468.4, 468.8, 198/468.01; 414/788.4, 794.3, 793.4, 797

(56) References Cited

U.S. PATENT DOCUMENTS

| | | | |
|---|---|---|---|
| 3,516,653 | * | 6/1970 | Blend ............................... 414/788.4 |
| 4,083,908 | * | 4/1978 | Kalvenes et al. ....................... 264/82 |
| 4,568,231 | * | 2/1986 | Czajka et al. .......................... 414/32 |
| 4,655,664 | * | 4/1987 | Feichtl et al. .......................... 414/32 |
| 4,793,118 | * | 12/1988 | Meier ...................................... 53/118 |
| 4,961,490 | * | 10/1990 | Risko et al. .......................... 198/433 |
| 5,487,637 | * | 1/1996 | Mojden et al. .................... 414/788.4 |
| 5,688,103 | * | 11/1997 | Tsuji et al. ............................ 414/752 |

FOREIGN PATENT DOCUMENTS

| | | |
|---|---|---|
| 4-12337 | 1/1992 | (JP) . |
| 6-106257 | 4/1994 | (JP) . |
| 7-125812 | 5/1995 | (JP) . |

* cited by examiner

Primary Examiner—Christopher P. Ellis
Assistant Examiner—Rashmi Sharma
(74) Attorney, Agent, or Firm—Blank Rome Comisky & McCauley LLP

(57) ABSTRACT

A material pallet (5) is disposed on a lower portion on a front side of a main body frame (3), a product pallet (7) which is capable of moving up and down is disposed on a lower portion on a rear side of the main body frame, a workpiece carrier (19) which has absorption pads (27) and is capable of moving up and down is disposed above the material pallet (5) in the frame, a loader (15) for moving the workpiece carrier to the plate member working machine is disposed, an unloader (31) is disposed so as to be capable of moving to the plate member working machine, a moving support table (33) which reciprocates between a position above the material pallet and a position above the product pallet (7) is disposed, a moving clamp (37) and a support clamp (35) are disposed respectively on front and rear sides in the position above the product pallet, and a control device (45) for controlling the respective units is disposed.

3 Claims, 5 Drawing Sheets

_US 6,179,547 B1_

WORK LOADING/UNLOADING APPARATUS

TECHNICAL FIELD

The present invention relates to a workpiece loading and unloading apparatus for loading workpieces into a plate member working machine, such as a turret punch press and a laser working machine, and unloading processed workpieces from the plate member working machine.

BACKGROUND ART

Conventionally, a workpiece loading and unloading apparatus 201, which loads workpieces into a plate member working machine, such as a turret punch press and a laser working machine, and unloads the processed workpieces from the plate member working machine, has, as shown in FIG. 5, a stand-type main body frame 203, and a material pallet 205 on which workpieces W are stored is disposed on an upper portion on a front side (left side in FIG. 5) of the main body frame 203 so as to be capable of moving in a front-and-rear direction (right-and-left direction in FIG. 5).

A product pallet 207 on which the workpieces processed by the plate member working machine, namely, products G are stored is disposed on a lower portion on the front side of the main body frame 203 so as to be capable of moving up and down by means of a hydraulic lifter 209.

A loader 211, which is capable of moving to the plate member working machine (moving to a direction intersecting perpendicularly to a paper surface in FIG. 5), is disposed on the front side (left side in FIG. 5) of an upper frame 203U of the main body frame 203. The loader 211 is composed of a slider 213 and a workpiece carrier 215 which are capable of moving to the plate member working machine, and an air cylinder 217 as the workpiece carrier 215 is mounted to the slider 213.

An absorption frame 221 is disposed at a lower end of a piston rod 219 mounted to the air cylinder 217, and a plurality of absorption pads 223 are disposed on the absorption frame 221.

In addition, an unloader 225 having an unloader clamp (not shown) is provided on the front side (left side in FIG. 5) of the upper frame 203 of the main body frame 203 so as to be capable of moving to the plate member working machine.

According to the above constitution, when the workpiece W is loaded into the plate member working machine, the air cylinder 217 is operated, the piston rod 219 is lowered and the one workpiece W on the material pallet 205 is absorbed by the absorption pads 223. Next, after the piston rod 219 is lifted to its original position, the slider 213 of the loader 211 is moved to the plate member working machine, namely, an inner side of a direction intersecting perpendicularly to the paper surface in FIG. 5.

When the absorption pads 223 reach a position above a table of the plate member working machine, the movement of the slider 213 is stopped, and when the piston rod 219 is lowered by the operation of the air cylinder 217 and the absorption pads 223 are released, the workpiece W is put onto the table of the plate member working machine.

The workpiece W put onto the table of the plate member working machine is clamped by a workpiece clamp and moved and located so as to undergo desired plate member processing. While the workpiece W is undergoing the plate member processing, the slider 213 of the loader 211 is returned to its original position, and the unloader 225 is moved to the plate member working machine. Moreover, the material pallet 205 is moved to the right side in FIG. 5, and the product pallet 207 is lifted by the operation of the hydraulic lifter 209.

After the product G which underwent the plate member processed by means of the plate member working machine is clamped by the unloader clamp, the unloader 225 is returned to the original position, and the product G is located in a position above the product pallet 207 in FIG. 5. Next, when being unclamped from the unloader clamp, the product G is placed on the product pallet 207.

When a next workpiece W is processed, after the product pallet 207 is lowered by the operation of the hydraulic lifter 209 and the material pallet 205 is moved to the left side in FIG. 5 to be returned to the original position, the steps thereafter are repeated in the above-mentioned manner so that a lot of workpieces W undergo the plate member processing.

Incidentally, in the conventional workpiece loading and unloading apparatus 201, since the workpiece W on the material pallet 205 and the product G on the product pallet 207 are positioned up and down on the front side of the main body frame 203, there arises a problem such that a pass line is high and thus it is difficult to use this apparatus at the time of off-line.

In addition, when a workpiece W is loaded into the plate member working machine, it is necessary to move the material pallet 205 to the front and rear and to move up and down the product pallet 207. For this reason, the operation for loading and unloading the workpiece W is complicated, and it takes a long time to load and unload one workpiece W.

Furthermore, in the conventional workpiece loading and unloading apparatus 201, since a countermeasure against the case where a workpiece is processed in an emergency is not taken, it is difficult for the apparatus to cope with this situation.

Therefore, an object of the present invention is to provide a workpiece loading and unloading apparatus which is easily used at the time of off-line, and in which a time required for preparing a workpiece is shortened and interruption by another urgent workpiece which requires plate member processing is possible.

DISCLOSURE OF THE INVENTION

In order to achieve the above object, a workpiece loading and unloading apparatus of a first aspect of the invention for loading workpieces into a plate member working machine and unloading the processed workpieces from the plate member working machine, is characterized by including: a material pallet, disposed on a lower portion on a front side of a main body frame, for storing workpieces; a product pallet, for storing the processed workpieces, which is disposed on a lower portion on a rear side of the main body frame and is capable of moving up and down; a workpiece carrier which is disposed above the material pallet in the main body frame, has absorption pads for absorbing the workpieces and is capable of moving up and down; a loader for moving the workpiece carrier to the plate member working machine; an unloader which has an unloader clamp and is capable of moving to the plate member working machine; a moving support table which reciprocates between a position above the material pallet and a position above the product pallet; a moving clamp and support clamp which are capable of moving a front-and-rear direction and are disposed respectively on front and rear sides in the position above the product pallet; and a control device for controlling the respective units.

Therefore, after the absorption pads disposed on the lower portion of the workpiece carrier are lowered and the one workpiece on the material pallet provided on the lower portion on the front side of the main body frame is absorbed by the absorption pads, the workpiece carrier is lifted to its original position. In this state the loader is moved to the plate member working machine so that the workpiece carrier reaches a position above a workpiece table, for example, of the plate member working machine and is stopped. When the absorption pads are lowered and released, the workpiece is placed onto the workpiece table of the plate member working machine so as to undergo the plate member processing.

While the plate member process is executed, the loader is returned to its original position and the unloader is moved to the plate member working machine so as to wait. After the product which underwent the plate member processing is clamped by the unloader clamp provided to the unloader, the unloader is returned to its original position. Thereafter, when being unclamped from the unloader clamp, the product is placed onto the moving support table, and the moving support table is moved to the position above the product pallet. The product is clamped by the support clamp and moving clamp, and the moving support table is returned to the side of the material pallet. Thereafter, when being unclamped from the support clamp and moving clamp, the product is placed onto the product pallet.

Therefore, since the material pallet and product pallet are arranged not on up and down sides but on front and rear sides unlike the conventional apparatus, the apparatus can be easily used even at the time of off-line, and a time required for preparing a workpiece is shortened.

From a second aspect of the invention, a workpiece loading and unloading apparatus according to the first aspect, is characterized by further including a vibrating equipment which is disposed in the frame on the side of the support clamp and vibrates a processed workpiece clamped by the support clamp and moving clamp.

Therefore, in a state that the processed product is connected with the workpiece by a micro joint section, when the product is clamped by the support clamp and moving clamp and the vibrating equipment is operated, the product is disconnected from the workpiece so as to be placed on the product pallet.

From a third aspect of the invention, a workpiece loading and unloading apparatus according to the first aspect, is characterized in that the control device has an interrupt mode for allowing an urgent workpiece to interrupt an automatic operation for a workpiece in the plate member working machine.

Therefore, in the case where the workpiece is loaded from the workpiece loading and unloading apparatus into the plate member working machine so as to be processed therein and while a step of unloading the processed product is repeated continuously, an urgent workpiece interrupts this step when the interrupt mode provided in the control device is operated, the urgent workpiece is loaded into the plate member working machine and undergoes the plate member processing therein just when the currently processing workpiece is finished, and thereafter the processing of the workpiece, which was being processed before the urgent workpiece, is continued.

Accordingly, the interrupt processing which could not be executed conventionally can be executed immediately by providing the interrupt mode to the control device.

BEST MODE FOR CARRYING OUT THE INVENTION

There will be detailed below the embodiment of the present invention with reference to the drawings.

Figure 1:
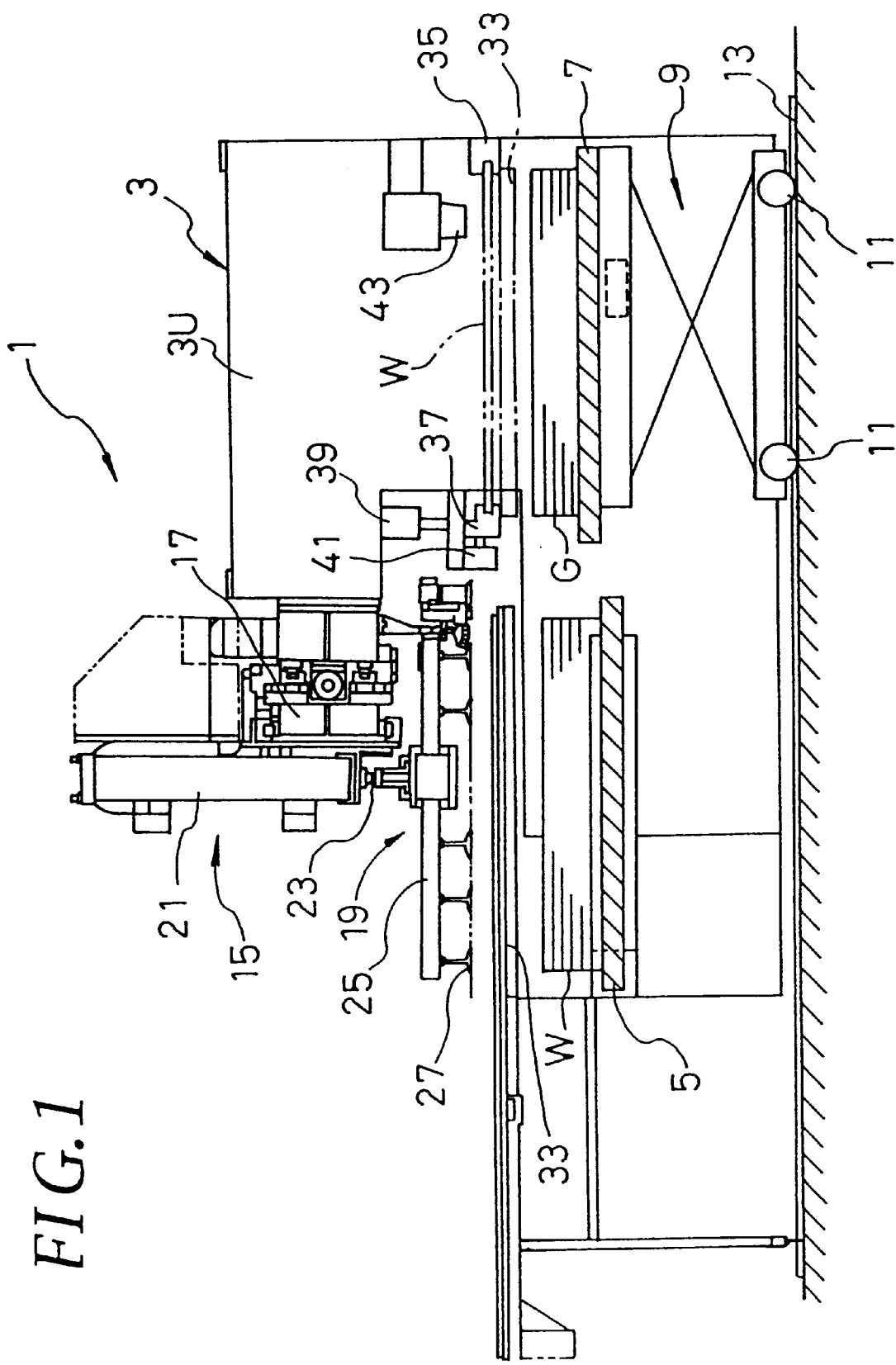
FIG. 1 is a side view of a workpiece loading and unloading apparatus of the present invention.
Figure 2:
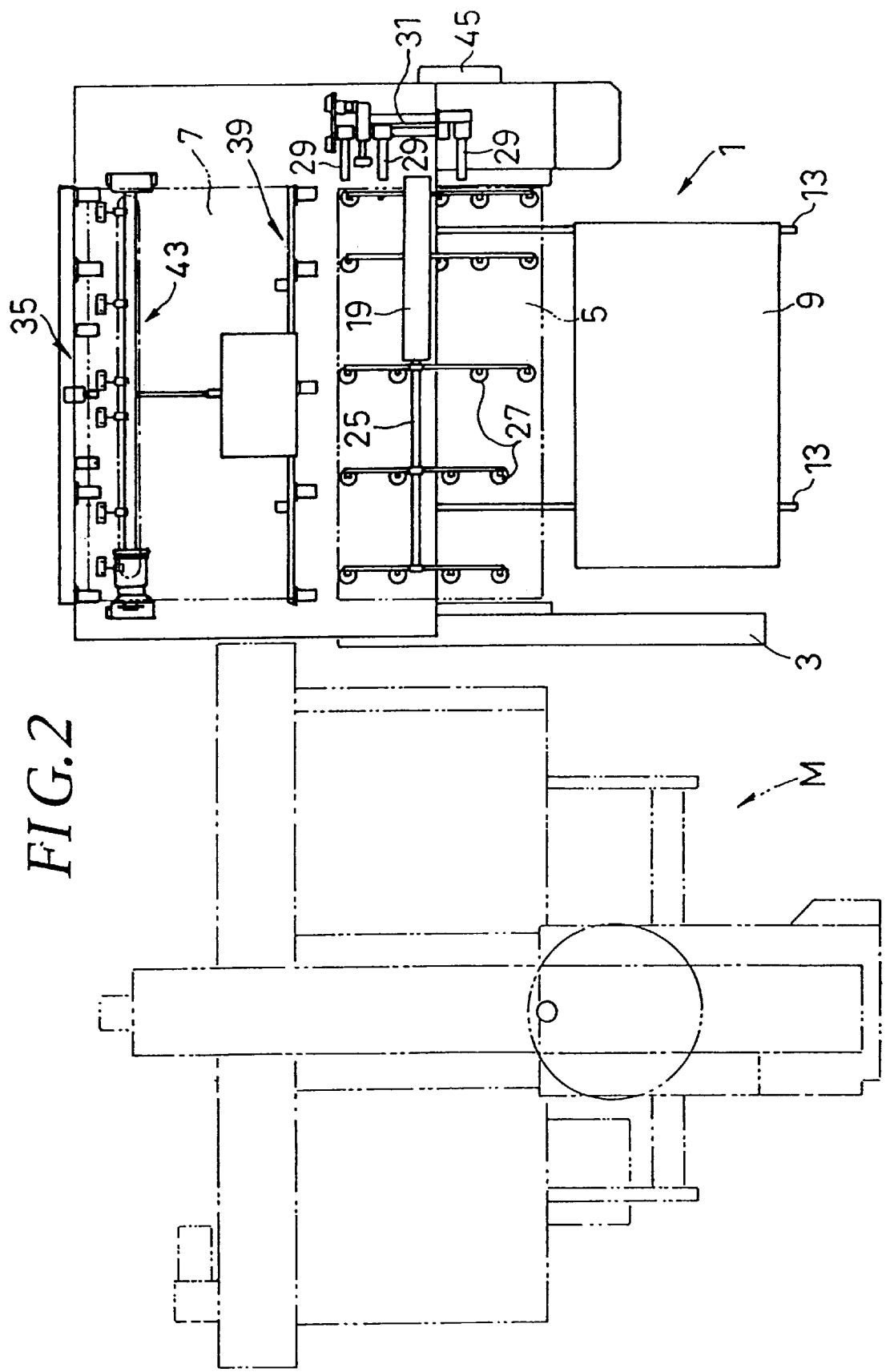
FIG. 2 is a plan view showing that the workpiece loading and unloading apparatus of the present invention is arranged in a vicinity of a turret punch press, for example, as a plate member working machine.

As shown in FIGS. 1 and 2, a workpiece loading and unloading apparatus 1 for loading and unloading workpieces W into and from a turret punch press M, for example, as a plate member working machine is disposed in a vicinity of the turret punch press M. This workpiece loading and unloading apparatus 1 has a stand-type main body frame 3, and a material pallet 5 on which workpieces are stored is disposed on a front side (left side in FIG. 1) of the main body frame 3 so as to be capable of moving up and down by a hydraulic lifter or the like (not shown). The material pallet 5 can move in order to load and unload the workpieces W therein and therefrom and to transfer the pallet at the time of FMS.

A product pallet 7 on which workpieces processed by the turret punch press M, namely, products G are stored is provided in a lower portion on a rear side (right side in FIG. 1, upper side in FIG. 2) of the main body frame 3. This product pallet 7 is placed on the hydraulic lifter 9 which is capable of moving up and down, and wheels 11 are mounted to four corners on the lower portion of the hydraulic lifter 9 so that the product pallet 7 moves on guide rails 13, which are provided in the a front-and-rear direction (up-and-down direction in FIG. 2), to the front-and-rear direction.

A loader 15, which is capable of moving to the turret punch press M (a direction intersecting perpendicularly to the paper surface in FIG. 1, capable of moving to the right-and-left direction in FIG. 2), is disposed on the front side (left side in FIG. 1) of an upper frame 3U of the main body frame 3. This loader 15 is composed of a slider 17 and a workpiece carrier 19 which are capable of moving to the turret punch press M, and an air cylinder 21 as the workpiece carrier 19 is mounted to the slider 17.

An absorption frame 25 is disposed at a lower end of a piston rod 23 mounted to the air cylinder 21, and a plurality of absorption pads 27 are disposed on the absorption frame 25.

In addition, as shown in FIG. 2, an unloader 31 having an unloader clamp 29 is disposed on the front side of the upper frame 3U of the main body frame 3 so as to be capable of moving to the turret punch press M. A moving support table 33 is disposed above the material pallet 5 in the main body frame 3 so as to be capable of moving to the front-and-rear direction.

According to the above constitution, when a workpiece W is loaded into the turret punch press M, the moving support table 33 is moved to position represented by an alternate long and two short dashed line on the right side of FIG. 1. Thereafter, the air cylinder 21 is operated so that the piston rod 23 is lowered, and the one workpiece W on the material pallet 5 is absorbed by the absorption pads 27. After the piston rod 23 is lifted to its original position, the slider 17 of the loader 15 is moved to the turret punch press M.

When the absorption pads 27 reach a position above a table of the turret punch press M, the moving of the slider 17 is stopped, and the piston rod 23 is lowered by the operation of the air cylinder 21 and the absorption pads 27 are released. Thereafter, the workpiece W is placed on the table of the turret punch press M.

The workpiece W which was placed on the table of the turret punch press M is clamped by the workpiece clamp and located so as to undergo desired punching process. While the workpiece W is undergoing the punching process, the slider 17 of the loader 15 is returned to its original position, and the unloader 31 is moved to the turret punch press M. Moreover, the moving support table 33 is moved to the left side in FIG. 1.

After the workpiece W, which is finished in the punching process by means of the turret punch press M, is clamped by the unloader clamp 29, when the unloader 31 is returned to its original position, the processed workpiece W is located in the position above the moving support table 33 in FIG. 1. Next, when being unclamped from the unloader clamp 29, the product G is placed on the moving support table 33.

A support clamp 35 is disposed on the right side above the product pallet 7 in FIG. 1 so as to be capable of moving to the front-and-rear direction by means of a fluid cylinder (not shown) in the main body frame 3. A moving clamp 37 is disposed on the left side above the product pallet 7 in the main body frame 3 so as to be capable of moving up and down and front and rear (capable of moving right and left in FIG. 1). This moving clamp 37 is moved to the up-and-down direction and the front-and-rear direction in an up-and-down-use air cylinder 39 and a front-and-rear-use air cylinder 41, for example. When the products G are collected on the product pallet 7, the support clamp 35 is moved backward about 30 mm, for example.

In addition, in FIG. 1, a separation hammer 43, for example, as a vibrating equipment is provided above the support clamp 35 in FIG. 1. When a drive shaft is rotated by rotation of an eccentric cam, for example, this separation hammer 43 is moved up and down by a hammer pushing-up cylinder.

According to the above constitution, when the moving support table 33 on the left side in FIG. 1, on which the processed workpiece W is placed, is moved to the right side in FIG. 1 so as to reach the position represented by the alternate long and two short dashed line, one end of the product G on the moving support table 33 is clamped by the support clamp 35. Moreover, when the moving clamp 37 is lowered and is moved to the right side in FIG. 1, the other end of the product G is clamped by the moving clamp 37.

Since the processed workpiece W is connected with a plurality of the products G via micro joints (micro connecting section), when the workpiece W is vibrated by the operation of the separation hammer 43 with the workpiece W being clamped by the support clamp 35 and the moving clamp 37, the plural products G connected with the workpiece W are disconnected so as to drop and placed onto the product pallet 7 with them forming a line, and a skeleton is also placed simultaneously by unclamping it from the support clamp 35 and the moving clamp 37. Thereafter, when the moving clamp 37 and the separation hammer 43 are returned to their original positions, a series of the steps for loading and unloading the workpiece W is completed.

Hereinafter, when the above steps are repeated continuously, plural workspieces W stored on the material pallet 5 undergo a desired punching process.

In this embodiment, unlike the conventional manner, the material pallet 5 and the product pallet 7 are provided not up and down but front and rear positions, and the material pallet 5 is not moved front and rear but the moving support table 33 is moved front and rear. As a result, the apparatus is easily used, and a time required for preparing one workpiece W can be shortened.

In addition, since the support clamp 35 and moving clamp 37 which can move in the front-and-rear direction are disposed and the separation hammer 43 is also disposed, plural products G connected with the processed workpiece W can be separated simply and easily.

Figure 3:
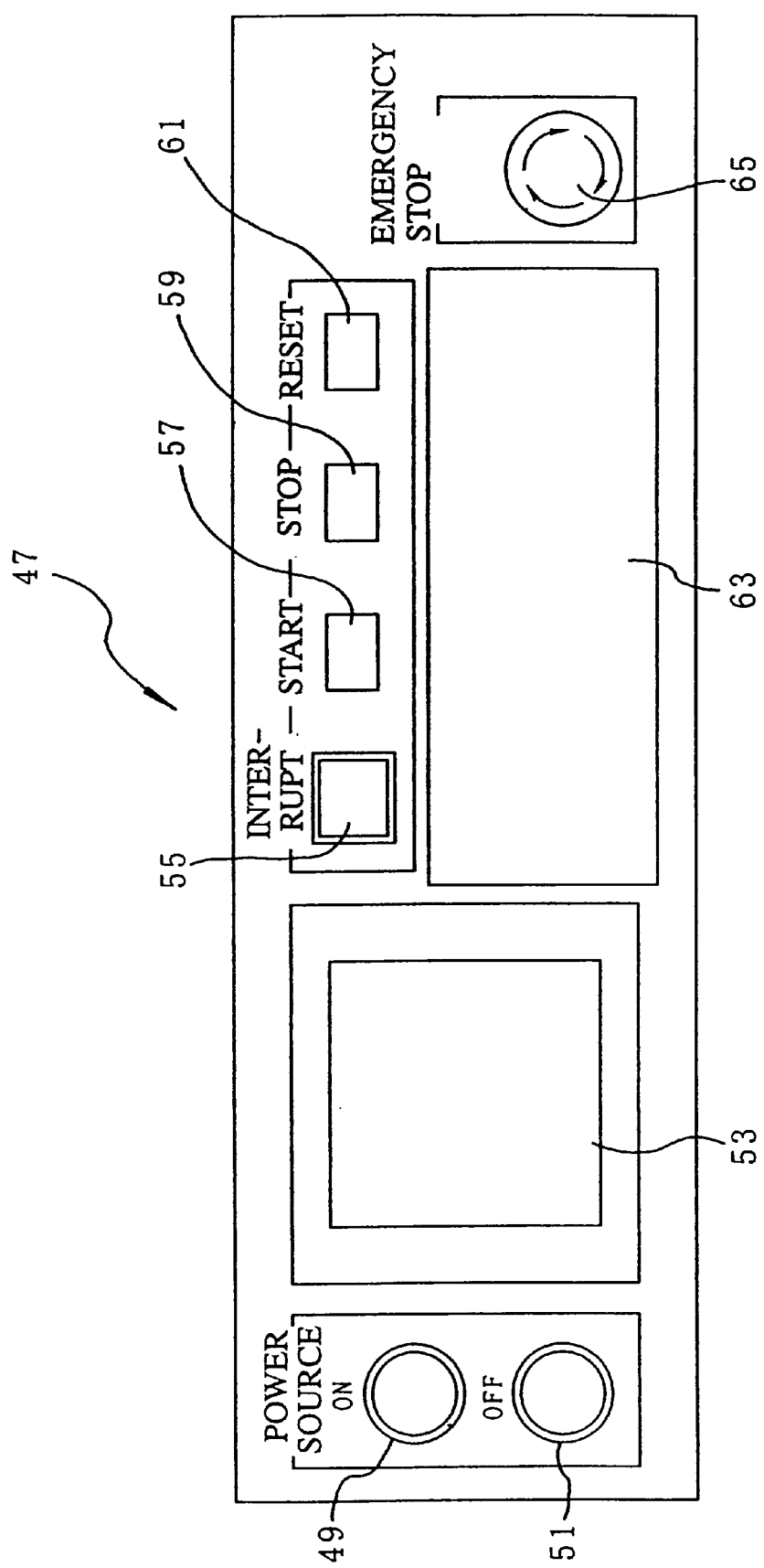
FIG. 3 is a front view of an operation panel in a control device.

A control device 45 which controls the workpiece loading and unloading apparatus 1 is disposed on a right side wall of the frame 3. The workpieces W are loaded and unloaded automatically by the control device 45. On an operation panel 47 of the control device 45, a power source-on button 49 and a power source-off button 51 are arranged on the left side in FIG. 3, and an operation display screen 53 is disposed on their right side.

A interrupt button 55 for an interrupt mode, a start button 57, a stop button 59 and a rest button 61 are arranged on an upper position on the right side of the operation display screen 53 in this order from left to right. A manual switch cover 63 is disposed below these buttons. An emergency stop button 65 is disposed on the right side of the manual switch cover 63.

When the power source-on button 49 is pushed, the control device 45 is turned on, and when the power source-off button 51 is pushed, the control device 45 is turned off. Before the operation is started by pushing the start button 57, a check is made that there are no other operators and obstacles. Further, when the next operation is executed, the start button 57 is pushed so that the operation is started. The start button 57 is lighted only while the operation is executed.

When the operation of the machine is desired to be stopped, the stop button 59 is pushed, and the operation of the machine is temporarily stopped. Further, when this stop button 59 is pushed and an alarm for stopping the operation is given, a lamp of this button 59 is lighted. When the alarm is given, the cause is removed and the rest button 61 is pushed so that the alarm is canceled. Moreover, when the reset button 61 is pushed during the operation, the operation is ended.

When the emergency stop button 65 is pushed, all the units of the workpiece loading and unloading apparatus 1 are stopped in that state, the turret punch press M is temporarily stopped. In order to cancel the emergency stop, the emergency stop button 65 is turned right, and the rest button 61 is pushed.

When the interrupt button 55 is pushed, its lamp is lighted and the operation is in the interrupt mode. The lamp is lighted only when the interrupt is possible. Moreover, when the interrupt button 55 is pushed during the automatic operation, the lamp blinks, and after the absorbed workpiece W is processed and unloaded, the operation is in the interrupt mode and the lamp is lighted so that an urgent workpiece W is processed. When the interrupt button 55 is pushed again, the lamp is turned off so that the interrupt mode is canceled.

Figure 4:
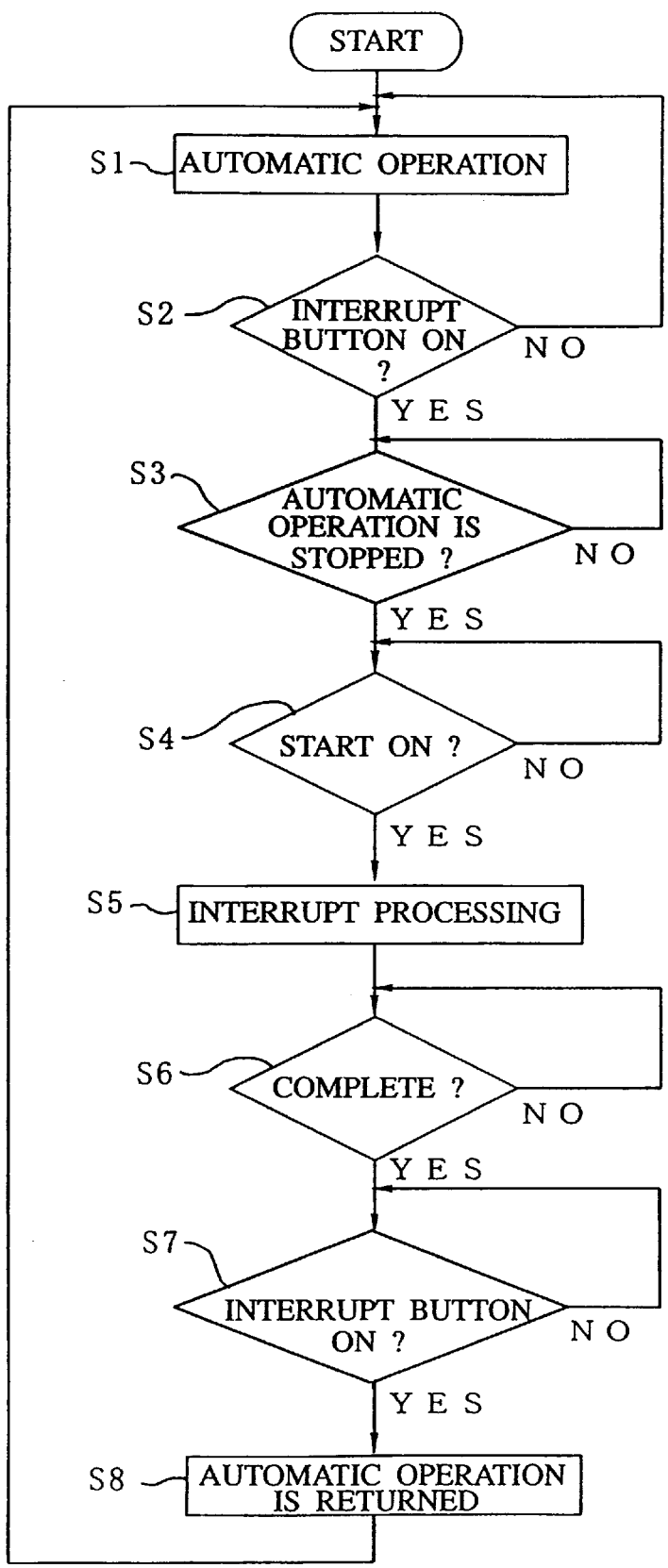
FIG. 4 is a flow chart showing an operation for allowing processing of an urgent workpiece to interrupt an automatic operation.
Figure 5:
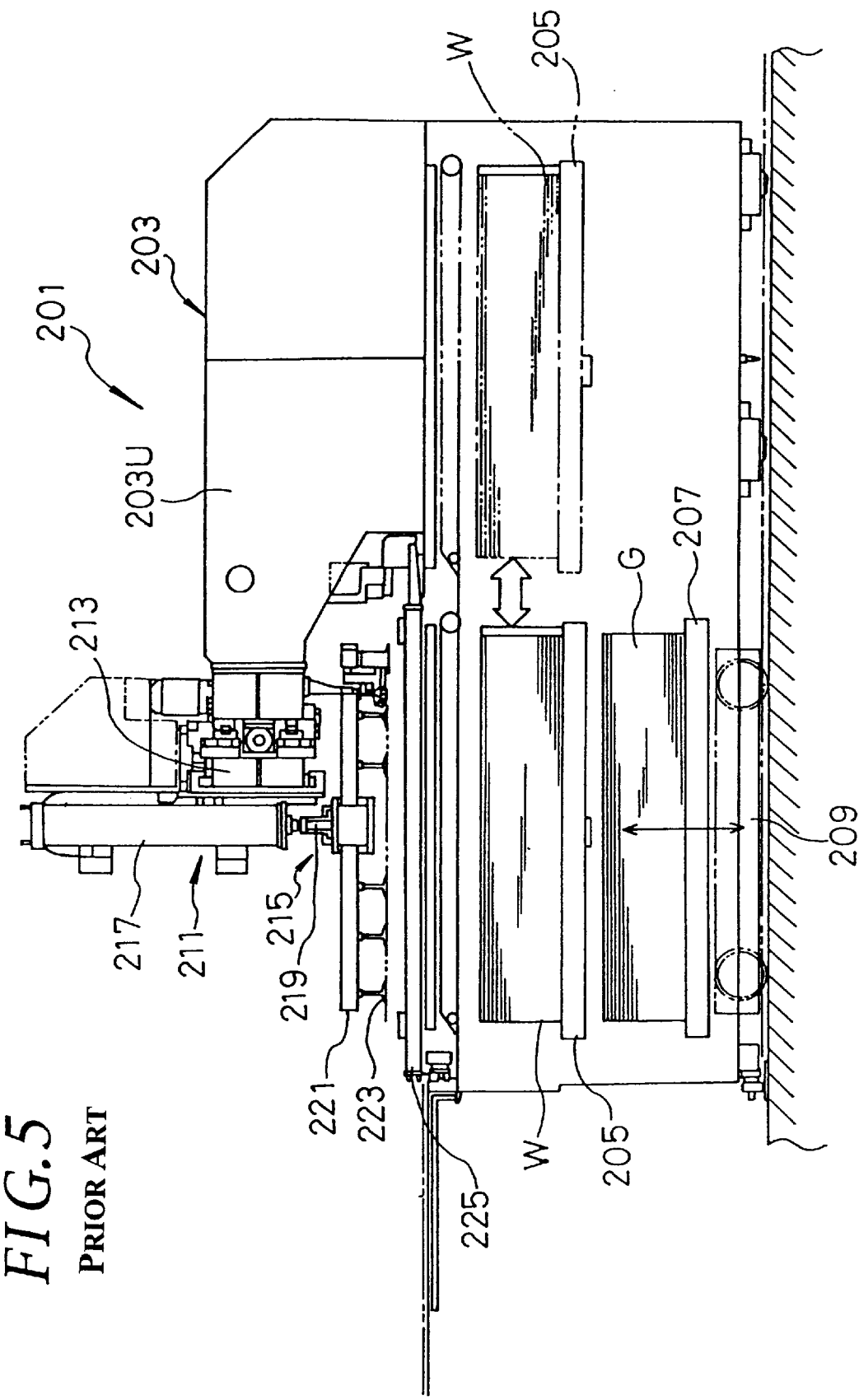
FIG. 5 is a side view of a conventional workpiece loading and unloading apparatus.

According to the above constitution, a series of the steps of executing the emergency interrupt process during the automatic operation will be described based on the flow chart shown in FIG. 4. While the automatic operation is performed on a workpiece W at step S1, when the interrupt button 55 is pushed at step S2, the interrupt button 55 starts to blink. After the absorbed workpiece W is processed at step S3 and is unloaded, the automatic operation is completed, and the display on the operation display screen 53 is changed into the interrupt mode screen so that the interrupt button 55 is lighted.

When the start button 57 is pushed at step S4, the interrupt process is started at step S5, loading, punching process and unloading are executed. After the completion of the interrupt process is checked at step S6, when the interrupt button 55 is pushed at step S7, the interrupt button 55 is turned off and the automatic operation is returned at step S8. Then, the display of the operation display screen is changed into the operation mode, and when the start button 57 is pushed, the automatic operation is restarted.

Therefore, in the conventional workpiece loading and unloading apparatus, the automatic operation cannot be interrupted by an urgent workpiece and the workpiece cannot be processed, but in the present embodiment, the automatic operation is interrupted by an urgent workpiece W so that the workpiece W can be processed immediately only by pushing the interrupt button 55 and the start button 57.

Here, the present invention is not limited to the above-mentioned embodiment, and the other forms can carry out the present invention by making suitable changes and variations.

Industrial Applicability

As mentioned above, the workpiece loading and unloading apparatus of the present invention is useful as a plate member loading and unloading apparatus for loading a workpiece into a plate member working machine such as a turret punch press and a laser working machine and unloading the processed workpiece from the plate member working machine. Further, in a plate member processing line composed by a combination of the turret punch press and an automatic storehouse, the workpiece loading and unloading apparatus of the present invention can be applied as a plate member loading and unloading apparatus for loading a workpiece between the plate member working machine and the automatic storehouse and unloading the processed workpiece from the plate member working machine.

What is claimed is:

1. A workpiece loading and unloading apparatus for loading workpieces into a plate member working machine and unloading the processed workpieces from the plate member working machine, comprising:

a material pallet disposed on a lower portion on a front side of a main body frame for storing workpieces;

a product pallet, for storing the processed workpieces, which is disposed on a lower portion on a rear side of said main body frame and is capable of moving up and down;

a workpiece carrier which is disposed above said material pallet in said main body frame has absorption pads for absorbing the workpieces and is capable of moving up and down;

a loader for moving said workpiece carrier to said plate member working machine;

an unloader which has an unloader clamp and is capable of moving to said plate member working machine;

a moving support table which reciprocates between a position above said material pallet and a position above said product pallet;

a moving clamp and support clamp which are capable of moving a front-and-rear direction and are disposed respectively on front and rear sides in the position above said product pallet; and a control device for controlling said respective units.

2. The workpiece loading and unloading apparatus according to claim 1, further comprising:

a vibrating equipment disposed in the frame on the side of said support clamp, the vibrating equipment vibrating a processed workpiece clamped by said support clamp and moving clamp.

3. The workpiece loading and unloading apparatus according to claim 1, wherein said control device has an interrupt mode for allowing an urgent workpiece to interrupt an automatic operation for a workpiece in said plate member working machine.

* * * * *